(12) United States Patent
Kleinschmidt (10) Patent No.: US 6,603,789 B1
(45) Date of Patent: Aug. 5, 2003

(54) NARROW BAND EXCIMER OR MOLECULAR FLUORINE LASER WITH IMPROVED BEAM PARAMETERS

(75) Inventor: Juergen Kleinschmidt, Weissenfels (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/900,703

(22) Filed: Jul. 5, 2001

Related U.S. Application Data
(60) Provisional application No. 60/215,933, filed on Jul. 5, 2000.

(51) Int. Cl.$^7$ .............................................. H01S 3/22
(52) U.S. Cl. ................................. 372/57; 372/102
(58) Field of Search .................... 372/102, 57, 108

(56) References Cited

U.S. PATENT DOCUMENTS

| | | | |
|---|---|---|---|
| 3,582,190 A | 6/1971 | Smith | 350/310 |
| 3,899,750 A | 8/1975 | Hochuli | 331/94.5 |
| 4,156,209 A | 5/1979 | Herbst et al. | 331/94.5 |
| 4,360,925 A | 11/1982 | Brosnan et al. | 372/95 |
| 4,399,540 A | 8/1983 | Bucher | 372/20 |
| 4,429,392 A | 1/1984 | Yoshida et al. | 372/9 |
| 4,477,909 A | 10/1984 | Salvi et al. | 372/95 |
| 4,534,034 A | 8/1985 | Hohla et al. | 372/59 |
| 4,611,270 A | 9/1986 | Klauminzer et al. | 364/183 |
| 4,616,908 A | 10/1986 | King | 350/576 |
| 4,664,488 A | 5/1987 | Sawicki et al. | 350/611 |
| 4,691,322 A | 9/1987 | Nozue et al. | 372/82 |
| 4,696,012 A | 9/1987 | Harshaw | 372/99 |
| 4,740,982 A | 4/1988 | Hakuta et al. | 372/59 |
| 4,829,536 A | 5/1989 | Kajiyama et al. | 372/57 |
| 4,856,018 A | 8/1989 | Nozue et al. | 372/98 |
| 4,860,300 A | 8/1989 | Baumler et al. | 372/57 |
| 4,873,692 A | 10/1989 | Johnson et al. | 372/20 |
| 4,905,243 A | 2/1990 | Lokai et al. | 372/32 |
| 4,906,087 A | 3/1990 | Ealey | 350/611 |
| 4,918,704 A | 4/1990 | Caprara et al. | 372/99 |
| 4,926,428 A | 5/1990 | Kajiyama et al. | 372/20 |
| 4,972,429 A | 11/1990 | Herbst | 372/100 |
| 4,975,919 A | 12/1990 | Amada et al. | 372/33 |
| 4,977,573 A | 12/1990 | Bittenson et al. | 372/81 |
| 5,025,445 A | 6/1991 | Anderson et al. | 372/20 |
| 5,081,635 A | 1/1992 | Wakabayashi et al. | 372/57 |

(List continued on next page.)

FOREIGN PATENT DOCUMENTS

| | | | |
|---|---|---|---|
| DE | 42 25 781 | 2/1994 | H01S/3/08 |
| DE | 295 21 572 U1 | 12/1997 | H01S/3/038 |
| DE | 298 22 082 | 3/1999 | H01S/3/08 |
| DE | 298 22 090 | 3/1999 | H01S/3/08 |
| EP | 0 472 727 A1 | 3/1992 | |
| JP | 5-152666 | 6/1993 | |
| WO | WO 96/16455 | 5/1996 | 3/8 |

OTHER PUBLICATIONS

H.H. Barrett, et al., "Retroreflective Arrays as Approximate Phase Conjugators," *Optics Letters*, vol. 4, No. 6, Jun. 1979, pp. 190–192.

(List continued on next page.)

*Primary Examiner*—Paul Ip
*Assistant Examiner*—Hung Vy
(74) *Attorney, Agent, or Firm*—Stallman & Pollock LLP (57) ABSTRACT

An excimer or molecular fluorine laser system includes a discharge chamber filled with a gas mixture including a halogen-containing molecular species and at least one noble gas including a buffer gas, multiple electrodes within the discharge chamber and connected to a pulsed power supply circuit for energizing the gas mixture, and a resonator for generating an output beam. The resonator includes the discharge chamber and one or more optics for narrowing a bandwidth of the beam and for magnifying the beam in each of orthogonal beam axis directions for suppressing fluctuations in one or more output beam parameters.

55 Claims, 3 Drawing Sheets

U.S. PATENT DOCUMENTS

| | | | | |
|---|---|---|---|---|
| 5,090,020 | A | 2/1992 | Bedwell | 372/59 |
| 5,095,492 | A | 3/1992 | Sandstrom | 372/102 |
| 5,142,543 | A | 8/1992 | Wakabayashi et al. | 372/32 |
| 5,150,370 | A | 9/1992 | Furuya et al. | 372/106 |
| 5,221,823 | A | 6/1993 | Usui | 219/121.78 |
| 5,226,050 | A | 7/1993 | Burghardt | 372/20 |
| 5,325,378 | A | 6/1994 | Zorabedian | 372/20 |
| 5,337,330 | A | 8/1994 | Larson | 372/86 |
| 5,377,215 | A | 12/1994 | Das et al. | 372/57 |
| 5,396,514 | A | 3/1995 | Voss | 372/57 |
| 5,404,366 | A | 4/1995 | Wakabayashi et al. | 372/29 |
| 5,440,578 | A | 8/1995 | Sandstrom | 372/59 |
| 5,450,207 | A | 9/1995 | Fomenkov | 250/226 |
| 5,450,436 | A | 9/1995 | Mizoguchi et al. | 372/59 |
| 5,535,233 | A | 7/1996 | Mizoguchi et al. | 372/87 |
| 5,557,629 | A | 9/1996 | Mizoguchi et al. | 372/87 |
| 5,559,584 | A | 9/1996 | Miyaji et al. | 355/73 |
| 5,559,816 | A | 9/1996 | Basting et al. | 372/27 |
| 5,572,543 | A | 11/1996 | Heinemann et al. | 372/107 |
| 5,596,456 | A | 1/1997 | Luecke | 359/831 |
| 5,596,596 | A | 1/1997 | Wakabayashi et al. | 372/102 |
| 5,642,374 | A | 6/1997 | Wakabayashi et al. | 372/57 |
| 5,646,954 | A | 7/1997 | Das et al. | 372/55 |
| 5,657,334 | A | 8/1997 | Das et al. | 372/33 |
| 5,659,419 | A | 8/1997 | Lokai et al. | 359/330 |
| 5,663,973 | A | 9/1997 | Stamm et al. | 372/20 |
| 5,684,822 | A | 11/1997 | Partlo | 372/95 |
| 5,684,824 | A | 11/1997 | Hayakawa | 372/103 |
| 5,729,562 | A | 3/1998 | Birx et al. | 372/38 |
| 5,729,565 | A | 3/1998 | Meller et al. | 372/87 |
| 5,748,316 | A | 5/1998 | Wakabayashi et al. | 356/352 |
| 5,748,346 | A | 5/1998 | David et al. | 359/15 |
| 5,761,236 | A | 6/1998 | Kleinschmidt et al. | 372/100 |
| 5,763,855 | A | 6/1998 | Shioji | 219/121.84 |
| 5,802,094 | A | 9/1998 | Wakabayashi et al. | 372/57 |
| 5,811,753 | A | 9/1998 | Weick | 219/121.78 |
| 5,818,865 | A | 10/1998 | Watson et al. | 372/86 |
| 5,835,520 | A | 11/1998 | Das et al. | 372/57 |
| 5,852,627 | A | 12/1998 | Ershov | 372/108 |
| 5,856,991 | A | 1/1999 | Ershov | 372/57 |
| 5,875,207 | A | 2/1999 | Osmanow | 372/86 |
| 5,898,725 | A | 4/1999 | Fomenkov et al. | 372/102 |
| 5,901,163 | A | 5/1999 | Ershov | 372/20 |
| 5,914,974 | A | 6/1999 | Partlo et al. | 372/38 |
| 5,917,849 | A | 6/1999 | Ershov | 372/102 |
| 5,936,988 | A | 8/1999 | Partlo et al. | 372/38 |
| 5,940,421 | A | 8/1999 | Partlo et al. | 372/38 |
| 5,946,337 | A | 8/1999 | Govorkov et al. | 372/92 |
| 5,949,806 | A | 9/1999 | Ness et al. | 372/38 |
| 5,970,082 | A * | 10/1999 | Ershov | 372/102 |
| 5,978,391 | A | 11/1999 | Das et al. | 372/20 |
| 5,978,394 | A | 11/1999 | Newman et al. | 372/32 |
| 5,978,406 | A | 11/1999 | Rokni et al. | 372/58 |
| 5,978,409 | A | 11/1999 | Das et al. | 372/100 |
| 5,982,795 | A | 11/1999 | Rothweil et al. | 372/38 |
| 5,982,800 | A | 11/1999 | Ishihara et al. | 372/57 |
| 5,991,324 | A | 11/1999 | Knowles et al. | 372/57 |
| 5,999,318 | A | 12/1999 | Morton et al. | 359/572 |
| 6,005,880 | A | 12/1999 | Basting et al. | 372/38 |
| 6,014,206 | A | 1/2000 | Basting et al. | 356/138 |
| 6,020,723 | A | 2/2000 | Desor et al. | 320/166 |
| 6,021,153 | A | 2/2000 | Okada | 372/99 |
| 6,028,872 | A | 2/2000 | Partlo et al. | 372/38 |
| 6,028,879 | A | 2/2000 | Ershov | 372/57 |
| 6,028,880 | A | 2/2000 | Carlesi et al. | 372/58 |
| 6,061,382 | A | 5/2000 | Govorkov et al. | 372/101 |
| 6,081,542 | A | 6/2000 | Scaggs | 372/70 |
| 6,094,448 | A | 7/2000 | Fomenkov et al. | 372/102 |
| 6,151,346 | A | 11/2000 | Partlo et al. | 372/38 |
| 6,154,470 | A | 11/2000 | Basting et al. | 372/19 |
| 6,157,662 | A | 12/2000 | Scaggs et al. | 372/60 |
| 6,160,831 | A | 12/2000 | Kleinschmidt et al. | 372/57 |
| 6,160,832 | A | 12/2000 | Kleinschmidt et al. | 372/57 |
| 6,163,559 | A | 12/2000 | Watson | 372/102 |
| 6,192,064 | B1 | 2/2001 | Algots et al. | 372/99 |
| 6,198,761 | B1 | 3/2001 | von Bergmann et al. | 372/86 |
| 6,212,214 | B1 | 4/2001 | Vogler et al. | 372/59 |
| 6,212,217 | B1 | 4/2001 | Erie et al. | 372/102 |
| 6,219,368 | B1 | 4/2001 | Govorkov | 372/59 |
| 6,226,307 | B1 | 5/2001 | Desor et al. | 372/37 |
| 6,243,405 | B1 | 6/2001 | Borneis et al. | 372/57 |
| 6,243,406 | B1 | 6/2001 | Heist et al. | 372/59 |
| 6,269,110 | B1 | 7/2001 | Leinhos et al. | 372/57 |
| 6,272,158 | B1 | 8/2001 | Kleinschmidt et al. | 372/32 |
| 6,285,701 | B1 | 9/2001 | Albrecht et al. | 372/57 |
| 6,298,080 | B1 | 10/2001 | Heist et al. | 372/99 |
| 6,330,261 | B1 | 12/2001 | Ishihara et al. | 372/38.1 |
| 6,381,257 | B1 * | 4/2002 | Ershov et al. | 372/57 |
| 6,404,796 | B1 | 6/2002 | Albrecht et al. | 372/57 |
| 6,421,365 | B1 * | 7/2002 | Kleinschmidt et al. | 372/108 |

OTHER PUBLICATIONS

N. Tan–No, et al., "Dispersion–free Amplification and Oscillation in Phase–Conjugate Four–wave Mixing in an Atomic Vapor Doublet," *IEEE Journal of Quantum Electronics*, vol. QE–16, No. 2, Feb. 1980, pp. 147–153.

M.D. Levenson, et al., "Projection Photolithography by Wave–front Conjugation," *J. Opt. Soc. Am.*, vol. 71, No. 6, Jun. 1981, pp. 737–743.

Bigio, et al., "Injection–Locking Unstable Resonator Excimer Lasers," *IEEE Journal of Quantum Electronics*, vol. QE–19, No. 9., Sep. 1983.

Taylor, R.S., "Preionization and Discharge Stability Study of Long Optical Pulse Duration UV–Preionized XeCl Lasers," *Applied Physics B*, vol. B 41., No. 1., Sep. 1986.

Sandstrom, R.L., et al., "Measurements of Beam Characteristics Relevant to DUV Microlithography on a KrF Excimer Laser," *Optical/Laser Microlithography III, International Society of Optical Engineering*, vol. 1264., Mar. 7–9, 1990.

"Lasers, Photonics, and Enviromental Optics," *Applied Optics*, Jan. 20, 1992, vol. 31., No. 3.

Kawata, et al., "Spatial Coherence of KrF Excimer Lasers," *Applied Optics*, vol. 31., No. 3., Jan. 20, 1992.

"Lambda Physik shows Readiness for the Future Challenges of Microlithography", Press Release, Dec. 1997.

Technology World Briefs, "Laser Could Extend Optical Lithography into VUV," *Photonics Spectra*, p. 48., Jan. 1998.

Robert K. Tyson, *Principles of Optics, $2^{nd}$ Edition*, Chapter 6: Wavefront Correction. pp. 203–228. No month–year.

* cited by examiner

NARROW BAND EXCIMER OR MOLECULAR FLUORINE LASER WITH IMPROVED BEAM PARAMETERS

This application claims the benefit of priority to U.S. provisional patent application No. 60/215,933, filed Jul. 5, 2000.

BACKGROUND OF THE INVENTION

1. Field of the Invention

The invention relates to excimer and molecular fluorine lasers, and particularly having an unstable resonator configuration for improving one or more beam parameters such as suppressing spectral fluctuations.

2. Discussion of the Related Art

A typical lithography laser resonator includes a plane-plane resonator configuration, and more generally, a stable cavity. For example, U.S. Pat. No. 5,095,492, 5,150,370 and 5,559,816, which are hereby incorporated by reference, describe lithography laser resonators having stable cavities, wherein the '492 patent describes a linear resonator and the '370 and '816 patents describe polarization coupled resonators.

Figure 1:
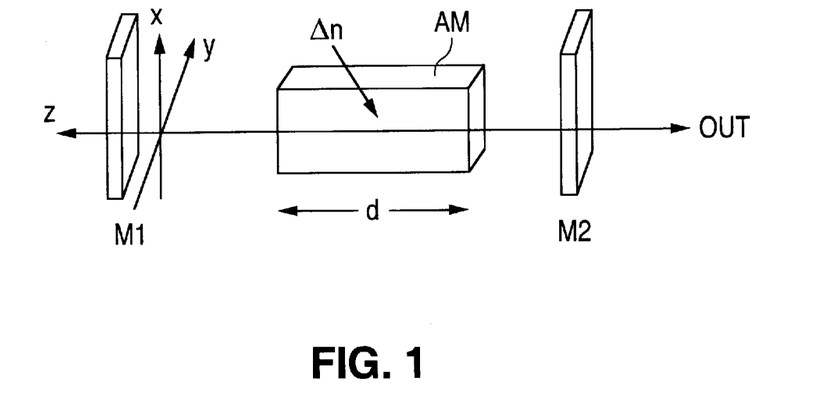
FIG. 1 schematically shows a plane-plane resonator configuration.

FIG. 1 schematically shows an illustrative laser resonator containing an active medium AM and two plane resonator mirrors M1 and M2. The active medium AM has a length d and it is recognized in the present invention that the active medium AM is characterized by a time-spatial dependent refractive index $n(x,y,t)=n_0+\Delta n(x,y,t)$. The refractive index change can be created, e.g., by non-uniform temperature change in the medium due to non-uniform power deposition. It is further recognized in the present invention that this effect may play a significant role for high power lasers such as high repetition rate lasers. For instance, if a beam passes through the active medium, it sees different optical path lengths s over the cross section due to the spatially-dependent optical path length $s(x,y,t)=d \cdot n(x,y,t)$. the time-spatial dependent path length $s(x,y,t)$ results in changes of the beam divergencies and/or beam direction. For m round trips through the cavity of a plane-plane resonator such as that illustrated schematically at FIG. 1, the beam sees the total path length $s=2 \cdot m \cdot n(x,y,t)$. That means that in a plane-plane cavity the wavefront distortion effect is amplified. This is illustrated by the solid line shown at FIG. 2. In view of this, it is recognized in the present invention that it would be advantageous to provide a resonator configuration that serves to suppress these wavefront distortions.

Narrow band excimer lasers having cylindrical unstable resonators A have been described in U.S. Pat. Nos.5,946,337 and 5,970,082, which are hereby incorporated by reference. The curvatures of the resonator optics (i.e., cylindrical mirrors and/or cylindrical lenses) are described as being oriented in one plane, while the dispersion plane of the narrow band optics (e.g., an intracavity grating) is aligned parallel or perpendicular to that unstable resonator plane in the '082 and '337 patents, respectively. It is desired according to the present invention to provide narrow band excimer or molecular fluorine laser radiation with low beam divergency in one dimension.

Excimer lasers are applied in the art of photolithography for production of integrated circuits. Achromatic imaging optics for this wavelength region are difficult to produce. For this reason, line-narrowed excimer laser radiation is used for photolithography in order to prevent errors caused by chromatic aberration. It is recognized herein that the bandwidths for different imaging systems tabulated below in Table 1 may substantially represent acceptable bandwidths for suppressing these chromatic aberrations for the laser wavelengths 248 nm (KrF laser), 193 nm (ArF laser), and 157 nm ($F_2$-laser).

TABLE 1

| | 248 nm | 193 nm | 157 nm |
|---|---|---|---|
| Imaging Optics | | | |
| Refractive Optics | 0.4–0.6 pm | 0.3–0.6 pm | 0.1 pm |
| Catadioptics | 20–100 pm | 10–40 pm | ≈1 pm |

Current lithography lasers work with repetition rates up to 2 kHz. To get higher throughput, it is recognized herein that repetition rates should be increased to 4 kHz or higher, e.g., 10 kHz or more. The averaged power in the laser cavity will rise as the repetition rate is increased, e.g., by a factor 2 to 4 or more, connected with a very high thermal load on all intracavity optical components, and especially of the narrow band optics. This results in wavefront distortions due to thermally induced changes of the refractive index resulting in time dependent variations of the laser spectrum and of near and far field intensity distributions. Additional variations of the refractive index in the cavity may be created by discharge fluctuations in the discharge chamber. Intracavity fluctuations of the beam can lead to changes in significant output beam parameters such as beam size, beam position, divergence, beam pointing, etc., outside of the cavity, also. One term that may be used to describe this effect is "beam dancing". Beam dancing may result, e.g., in energy fluctuations in the image plane due to apertures in the beam line to the stepper or in the light path in the stepper itself. It is recognized in the present invention that this effect should be suppressed as much as possible. It is also recognized in the present invention that one way to correct the beam is by using adaptive optical techniques (see R. K. Tyson, Principles of Adaptive Optics, Academic Press (1991), which is hereby incorporated by reference).

SUMMARY OF THE INVENTION

In view of the above, an unstable laser cavity in each of orthogonal cross section beam axis directions is provided to suppress angular, directional and/or other laser beam parameter instabilities.

Also in view of the above, a laser resonator is provided including one or more optics for magnifying the beam in each of orthogonal cross sectional beam axis directions for suppressing fluctuations in one or more output beam parameters.

In particular, an excimer or molecular fluorine laser system is provided including a discharge chamber filled with a gas mixture including at least a halogen-containing molecular species and a buffer gas, multiple electrodes within the discharge chamber and connected to a pulsed power supply circuit for energizing the gas mixture and a resonator for generating an output beam. The resonator includes the discharge chamber, at least one line-narrowing optic and resonator reflecting optics disposed at either end of said resonator. The resonator reflecting optics are configured to form an unstable resonator in each of orthogonal cross-sectional beam axis directions for suppressing fluctuations in one or more output beam parameters.

An excimer or molecular fluorine laser system is also provided including a discharge chamber filled with a gas mixture including at least a halogen-containing molecular species and a buffer gas, multiple electrodes within the discharge chamber and connected to a pulsed power supply circuit for energizing the gas mixture and a resonator for generating an output beam including the discharge chamber and resonator reflecting optics at either end. The system further includes a first intracavity optic for narrowing a bandwidth of the output beam and configured to magnify the beam in a first cross-sectional beam axis direction and a second intracavity optic configured to magnify the beam in a second cross-sectional beam axis direction angularly offset from the first cross-sectional beam axis direction. The first and second intracavity optics are configured for suppressing fluctuations in one or more output beam parameters.

An excimer or molecular fluorine laser system is further provided including a discharge chamber filled with a gas mixture including at least a halogen-containing molecular species and a buffer gas, multiple electrodes within the discharge chamber and connected to a pulsed power supply circuit for energizing the gas mixture and a resonator for generating an output beam including the discharge chamber and resonator reflecting surfaces at either end. The system further includes a first intracavity optic for narrowing a bandwidth of he output beam, a second intracavity optic configured to magnify the beam in a first cross-sectional beam axis direction and a third intracavity optic configured to magnify the beam in a second cross-sectional beam axis direction angularly offset from the first cross-sectional beam axis direction. The first, second and third intracavity optics are configured for suppressing fluctuations in one or more output beam parameters An excimer or molecular fluorine laser system is further provided including a discharge chamber filled with a gas mixture including at least a halogen-containing molecular species and a buffer gas, multiple electrodes within the discharge chamber and connected to a pulsed power supply circuit for energizing the gas mixture and a resonator for generating an output beam including the discharge chamber and resonator reflecting surfaces at either end. The system further includes an intracavity optic for narrowing a bandwidth of the output beam and configured to magnify the beam in a first and a second orthogonal cross-sectional beam axis directions for suppressing fluctuations in one or more output beam parameters.

An excimer or molecular fluorine laser system is also provided including a discharge chamber filled with a gas mixture including at least a halogen-containing molecular species and a buffer gas, multiple electrodes within the discharge chamber and connected to a pulsed power supply circuit for energizing the gas mixture and a resonator for generating an output beam including the discharge chamber and resonator reflecting surfaces at either end. The system further includes a first intracavity optic for narrowing a bandwidth of the output beam and a second intracavity optic configured to magnify the beam in a first and a second orthogonal cross-sectional beam axis directions for suppressing fluctuations in one or more output beam parameters.

An excimer or molecular fluorine laser system is also provided including a discharge chamber filled with a gas mixture including at least a halogen-containing molecular species and a buffer gas, multiple electrodes within the discharge chamber and connected to a pulsed power supply circuit for energizing the gas mixture and a resonator for generating an output beam including the discharge chamber and resonator reflecting optics at either end. The system also includes at least one optic for narrowing a bandwidth of the output beam, a first intracavity optic configured to magnify the beam in a first cross-sectional beam axis direction, and a second intracavity optic configured to magnify the beam in a second cross-sectional beam axis direction angularly offset from the first cross-sectional beam axis direction, for suppressing fluctuations in one or more output beam parameters.

An excimer or molecular fluorine laser system is further provided including a discharge chamber filled with a gas mixture including at least a halogen-containing molecular species and a buffer gas, multiple electrodes within the discharge chamber and connected to a pulsed power supply circuit for energizing the gas mixture, and a resonator for generating an output beam including the discharge chamber and resonator reflecting surfaces at either end. The system further includes at least one optic for narrowing a bandwidth of the output beam, a reflective optic configured to magnify the beam in a first cross sectional beam axis direction and an intracavity optic configured to magnify the beam in a second cross sectional beam axis direction angularly offset from the first cross sectional beam axis direction. The reflective and intracavity optics are configured for suppressing fluctuations in one or more output beam parameters.

A method for suppressing fluctuations in one or more beam parameters of an excimer or molecular fluorine laser system is also provided including energizing a gain medium of the laser system by applying a pulsed discharge for generating the beam, narrowing a bandwidth of the beam by interacting the beam with one or more line-narrowing optical elements and magnifying the beam in orthogonal cross-sectional beam axis directions by interacting the beam with one or more magnifying optical elements for suppressing the fluctuations in the one or more output beam parameters.

A method for suppressing fluctuations in one or more beam parameters of an excimer or molecular fluorine laser system is also provided including energizing a gain medium of the laser system by applying a pulsed discharge for generating the beam, narrowing a bandwidth of the beam by interacting the beam with one or more line-narrowing optical elements and magnifying the beam intracavity in orthogonal cross-sectional beam axis directions by interacting the beam with one or more magnifying optical elements for suppressing the fluctuations in the one or more output beam parameters.

A method for suppressing fluctuations in one or more beam parameters of an excimer or molecular fluorine laser system is also provided including energizing a gain medium of the laser system by applying a pulsed discharge for generating the beam, narrowing a bandwidth of the beam by interacting the beam with one or more line-narrowing optical elements and magnifying the beam intracavity in a first cross-sectional beam axis direction and magnifying the beam in a second cross-section beam axis direction angularly offset from the first cross sectional beam axis direction by interacting the beam with one or more magnifying optical elements for suppressing said fluctuations in said one or more output beam parameters.

INCORPORATION BY REFERENCE

What follows is a cite list of references each of which is, in addition to the background and any references cited therein, the invention summary, the abstract and the claims, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

- U.S. Pat. Nos. 5,970,082, 5,946,337, 6,061,382, 5,095,492, 5,150,370 and 5,559,816;
- U.S. patent applications Ser. Nos. 09/452,353, 09/09/598,552, 09/712,877, 09/594,892, 09/715,803, 60/280,398 and 09/843,604, which are assigned to the same assignee as the present application;
- PCT published application no. WO 01/18923 A1;
- R. K.Tyson, Principles of Adaptive Optics, Academic Press (1991); and
- A. E. Siegmann, Unstable Optical Resonators, Appl. Opt.13, 353 (1974).

DETAILED DESCRIPTION OF THE PREFERRED EMBODIMENTS

Below, preferred embodiments are described which are generally related to an excimer or molecular fluorine laser resonator including one or more optical elements for magnifying the beam in each of orthogonal cross sectional, or transverse, beam axis directions. In a particularly preferred embodiment, the resonator is an unstable resonator in one or preferably both orthogonal cross sectional beam axis directions. That is, one or more resonator reflectors are preferably convex in one or both orthogonal cross sectional beam axis directions. For example, one of the resonator reflectors may be spherical or toriqual, or one may be cylindrical in a first direction while the other is cylindrical in an orthogonal direction to the first direction. Alternatively, one or more optical elements which are preferably refractive elements may provide the magnification in one or both orthogonal cross sectional beam axis directions. The resonator, such as the unstable cavity, is provided to suppress beam fluctuations, or fluctuations in one or more parameters of the output beam, particularly for high power lasers such as may be operating at repetition rates of 1 kHz–4 kHz or higher.

The preferred unstable cavity is provided to minimize beam parameter fluctuations of a narrow band excimer or molecular fluorine laser. For this reason, line-narrowing and/or line-selection optics are also provided, preferably within the laser resonator and extracavity spectral filtering may also be used. The resonator of the preferred embodiments represents an advance over the resonators described in the '082 and 337 patents, incorporated by reference above, in that the resonator of the preferred embodiments is unstable in both lateral, transverse or cross sectional beam axis directions, i.e., the x and y directions. Of course, a pair of general curvatures in other than orthogonal cross sectional beam axis directions can serve to represent curvatures in orthogonal directions.

SENSITIVITY AGAINST INTRACAVITY ABERRATIONS

FIG. 1 schematically illustrates a conventional laser resonator wherein a beam generally propagates along the z-axis, and the x and y directions are orthogonal to the z direction. The resonator shown in FIG. 1 includes a highly reflective mirror M1 and a partially reflecting outcoupling mirror M2 surrounding a discharge tube DT. FIG. 1 indicates that changes in the refractive index of the gas mixture within the discharge tube DT may be responsible for fluctuations in the optical path length in the discharge tube, where this optical path length is equal to the index of refraction of the gases along the optical path times the geometric length of the discharge tube or s=n·d. In addition, the optical path lengths between the discharge tube DT and the resonator reflectors M1 and M2 may also change depending on any materials and conditions exist between along those optical paths. In preferred embodiments herein, it is recognized that particularly for KrF, ArF and $F_2$ lasers, the optical paths within optics modules (see elements 110 and 112 of FIG. 5) may change as gases in those modules 110, 112 and/or optics are heated and/or their pressures change.

Figure 2:
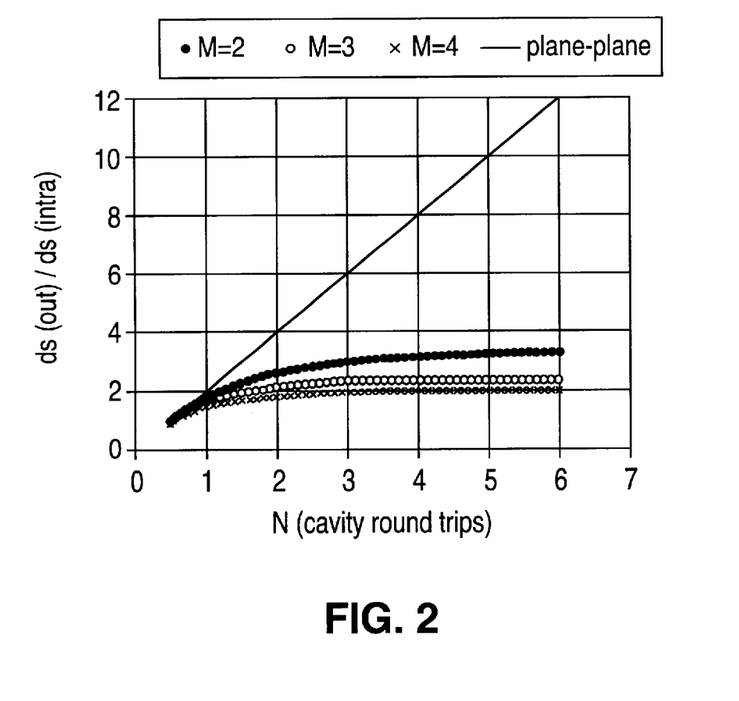
FIG. 2 is a graph showing a ratio of the phase front distortion of an output laser beam and variations of an intracavity optical path length with cross sectional beam axis position versus the average number of roundtrips the beam makes in the laser resonator for several magnifications of the beam by optics within the laser resonator.

Inside of the laser cavity, the refractive indices of the gain medium (e.g., caused by discharge or temperature fluctuations), the narrow band optics (e.g., induced by radiation and particularly absorption of radiation), and/or gases within optics module(s) that contain the narrow band optics may change with a spatial-temporal dependence such as by $\Delta n(x,y,t)$ resulting in a change of the optical path length ds, e.g., within the discharge tube DT, of $ds(intra)= \Delta n(x,y,t) \cdot d$, where $\Delta n(x,y,t)$ is the change of the refractive index particularly due to thermal effects. For a plane-plane resonator, the beam leaves the cavity after m roundtrips. The change of the optical path length is now given by $ds(out)= 2 \cdot m \cdot d \cdot \Delta n(x,y,t)$. The quantity $ds(out)/ds(intra)$ is here referred to as the sensitivity of the resonator against intracavity aberrations. Thus, for a plane-plane resonator, this is given by:

$ds(out)/ds(intra)=2 \cdot m$ (see the solid line in FIG. 2).

The x-y dependencies of the refractive index change may be nearly given by:

$$\Delta n(x,y,t)=[a(t) \cdot x]+[b(t) \cdot y]+[c(t) \cdot x^2]+[d(t) \cdot y^2]+.$$

The first two terms (the first order terms) represent changes of the beam direction or pointing stability, while the second two terms (the second order terms) represent lens effects resulting, e.g., in changes of the beam divergency. After some round trips (including traversing through the region with the changed refractive index), the radiation leaves the cavity with a phase front distortion characterized by ds(out)(x,y), where ds(out) determines the outcoupled aberration and the ratio ds(out)/ds(intra) characterizes the sensitivity of the resonator against intracavity aberrations.

A cross sectional laser beam intensity profile may be represented as I(x,y). The center of gravity of the beam can be calculated from the beam profile I(x,y). It is advantageous if the center of gravity of the beam profile I(x,y) is stable such that it does not fluctuate substantially. In the far-field, this stability of the center of gravity of the beam profile I(x,y) represents the pointing stability or directional stability of the beam. An additional mirror outside the resonator may be used to adjust the beam direction, but adjustments to this mirror would be slow compared to the repetition rate of the laser if the laser were operated, e.g., at 1–2 kHz, or 4 kHz, or more.

The intensity distribution I(x,y) may be illustratively parabolic. When a plane—plane resonator is used and the active medium AM, e.g., of FIG. 1 has a refractive index n(x,y,t), then the radius of curvature of the parabolic distribution would typically reduce as the beam traverses the active medium AM. It is recognized in the present invention, however, that this reduction of the radius of curvature of the intensity distribution can be suppressed if the beam is magnified within an unstable cavity. For example, if one or both of the mirrors M1 and/or M2 of FIG. 1 were changed to have a spherical or toriqual curvature according to a preferred embodiment herein, then the magnifying effect would reduce the radius of curvature of the intensity profile of the beam. This beam magnification or radius of beam intensity distribution reduction effect of the unstable cavity then advantageously offsets the radius of curvature reduction caused by the traversal of the beam through the active medium AM. The unstable cavity thus improves the angular and positional stability of the beam, and is particularly advantageous at high repetition rates wherein refractive index fluctuations due to thermal effects in the active medium AM may be generally increased.

FIG. 2 shows calculated dependencies of ds(out)/ds(intra) on the cavity round trip numbers for various different resonators (stable plane—plane resonator and unstable resonators with magnifications M=2, 3 and 4, as shown). From this it is clear that unstable cavities are much less sensitive against intracavity aberrations than the usual plane—plane resonator, especially for a resonator wherein the beam makes an average number or round trips of greater than 1. At a magnification of M=2, the sensitivity of the resonator against intracavity aberrations is reduced by around 50% for a beam averaging 2 round trips compared with a stable plane—plane resonator, by around 2–3 for 3 round trips, by around 2.5–4 for 4 round trips, by around 3–5 for 5 round trips and by around 3.5–6 for 6 round trips. As the magnification is increased, the sensitivity against intracavity aberrations decreases. This reduction in sensitivity is balanced against losses in energy, so that an appropriate magnification may be selected that is greater than 1 and yet not so large that energy efficiency is severely lowered such that performance is significantly compromised.

Figure 3:
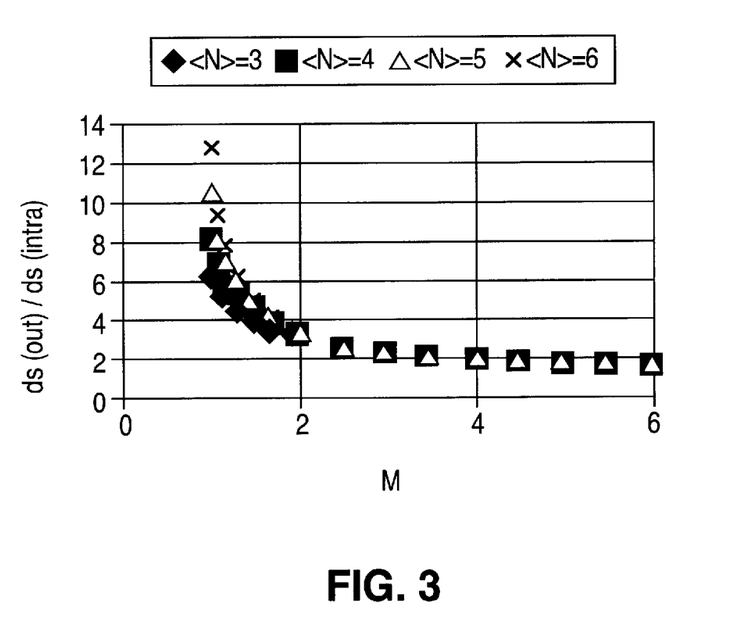
FIG. 3 is a graph showing a ratio of the phase front distortion of an output laser beam and variations of an intracavity optical path length with cross sectional beam axis position versus the magnification of the beam by optics within the laser resonator for several values of the average number of round trips the beam makes in the laser resonator.

FIG. 3 shows calculated dependencies of ds(out)/ds(intra) on the magnification M for various average numbers of round trips <N> of the beam in an unstable laser resonator, e.g., <N>=3,4,5 and 6, as shown. <N> means an averaged round trip number, i.e., averaged over typical excimer or molecular fluorine laser light pulses. From this, typical values for <N> are in the region 3–6. At a magnification of M=2, the sensitivity of the resonator against intracavity aberrations is reduced by around 77% for a beam averaging 6 round trips, by around 70% for a beam averaging 5 round trips, by around 63% for a beam averaging around 5 round trips and by around 57% for a beam averaging around 3 round trips, compared with a resonator such as a plane—plane resonator having a magnification around M=1. As the magnification is increased further, the sensitivity against intracavity aberrations decreases further, as shown. This reduction in sensitivity is balanced against losses in energy, so that an appropriate magnification may be selected that is greater than 1 and yet not so large that energy efficiency is severely lowered such that performance is significantly compromised. For example, a magnification of M=2 to 4 may be sufficient. The plots shown in FIG. 3 suggest that for M≧2, the sensitivity of the resonator against intracavity aberrations is weakly dependent on the number of round trips <N> and is also weakly dependent on the magnification M. An unstable resonator with M>≈2 can suppress the sensitivity against intracavity aberration processes by a factor of 3–6.

ILLUSTRATIVE RESONATOR ARRANGEMENTS

Figure 4A:
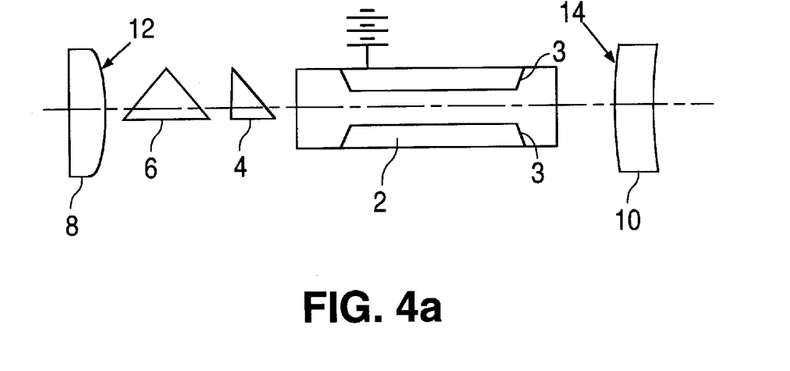
FIG. 4a schematically shows an unstable resonator configuration according to a preferred embodiment.
Figure 4B:
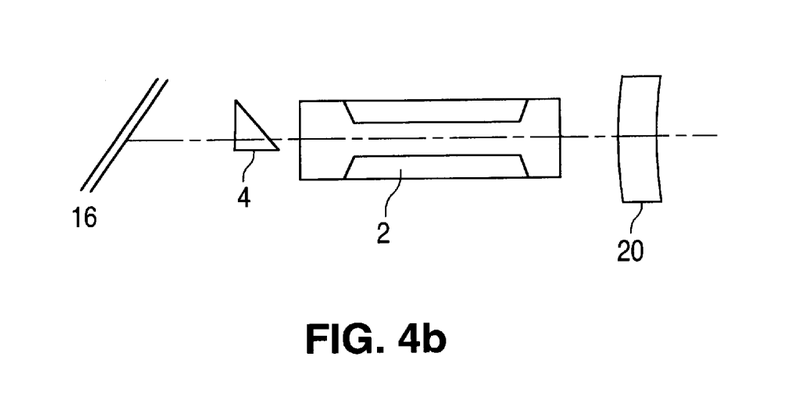
FIG. 4b schematically shows an unstable resonator configuration according to a preferred embodiment.

FIGS. 4a and 4b schematically illustrate preferred embodiments of a narrow band excimer or molecular fluorine laser resonator with an unstable cavity in each of orthogonal cross sectional or transverse beam axis directions for suppressing fluctuations of one or more beam parameters. Referring to FIG. 4a, the illustrative resonator includes a discharge chamber 2 filled with a gas mixture and having a pair of main discharge electrodes 3 therein connected to a discharge circuit (not shown, but see FIG. 5) for energizing the gas mixture. The resonator further includes line-narrowing and/or selection optics such as a beam expander 4 and a transmissive dispersive or interferometric element 6 such as one or more dispersive prisms, transmission gratings or grisms, birefringent plates and/or interferometric devices such as etalons or devices having non-parallel opposed plates such as those described in U.S. patent application Ser. Nos.09/715,803 and 60/280,398, which are assigned to the same assignee as the present application and are hereby incorporated by reference. The resonator of FIG. 4a may be for a semi-narrow band or a narrow band excimer or molecular fluorine laser, or for a very narrow band laser such as having a bandwidth of 0.6 pm or less.

The resonator shown in FIG. 4a further includes a pair resonator reflectors 8 and 10. Resonator reflector 8 may be highly reflective, while resonator reflector 10 is partially reflective such as to output couple the laser beam, or resonator reflector 10 may be highly reflective, while resonator reflector 8 is partially reflective such as to output couple the laser beam, or both resonator reflectors 8 and 10 may be highly reflective and the beam is output coupled by other means such as by reflection from an angled surface within the resonator such as by polarization coupling.

The resonator reflectors 8 and 10 of FIG. 4a are shown having convex reflecting surfaces 12 and 14, respectively. Surface 12 of reflector 8 may be cylindrical in a first cross-sectional beam axis direction, while surface 14 of reflector 10 may be cylindrical in a second cross sectional beam axis direction which is orthogonal or otherwise at an angle to the first cross sectional beam axis direction to provide magnification in each of orthogonal cross-sectional beam axis directions. Alternatively, one or both surfaces 12 and 14 may be spherical or toriqual or otherwise have a curvature in each of orthogonal cross-sectional beam axis directions, e.g., the x and y directions discussed above with reference to FIG. 1.

When one of the reflector surfaces 12 or 14 has a convex curvature in each of orthogonal cross-sectional beam axis directions, then the other surface 12 or 14 may be a plane surface or a convex or concave surface. For example, the other surface may be a concave or convex mirror or grating and may have a fixed or adjustable curvature, such as may be described at any of U.S. patent application Ser. No. 09/452,353, which is assigned to the same assignee as the present application and is hereby incorporated by reference, and U.S. Pat. Nos. 5,970,082 and 5,095,492, which are hereby incorporated by reference, such as for adjusting the bandwidth of the output beam or for compensating a wavefront curvature of the beam.

Although not illustrated in FIG. 4a, intracavity magnification of the beam in one or both cross-sectional beam axis directions may be achieved refractively or diffractively. For example, an intracavity optical element other than either of the resonator reflectors 8 or 10 may serve to magnify the beam in one or both cross sectional beam axis directions. A pair of intracavity optical elements other than the resonator reflectors 8 or 10 may serve to magnify the beam in first and second orthogonal cross sectional beam axis directions. Alternatively, one of the resonator reflectors 8 or 10 may serve to magnify the beam in a first cross sectional beam axis direction, while an intracavity optical element other than one or the reflectors 8 or 10 may serve to magnify the beam in another direction, such that magnification occurs in each of orthogonal cross sectional beam axis directions.

FIG. 4b schematically shows a variation of the resonator of FIG. 4a. FIG. 4b shows an excimer or molecular fluorine laser resonator including a discharge tube 2 filled with a gas mixture and having a pair of main discharge electrodes 3 therein connected to a discharge circuit (not shown, but see FIG. 5) for energizing the gas mixture. The resonator further includes line-narrowing and/or selection optics such as a beam expander 4 and a transmissive dispersive or interferometric element 16 such as one or more dispersive prisms, retroreflection gratings or grisms, birefringent plates and/or interferometric devices such as etalons or devices having non-parallel opposed plates such as those described in U.S. patent application Ser. Nos. 09/1715,803 and 60/280,398, which are assigned to the same assignee as the present application and are hereby incorporated by reference.

The preferred dispersive element 16 of the embodiment of FIG. 4b is a retro-reflection grating which may be cylindrically, spherically toriqually or otherwise convex or concave, or which may be substantially flat, and may have an adjustable or fixed curvature. The grating 16 may participate in magnifying the beam in one or both cross sectional beam axis directions, such as having a convex curvature in one or both directions, or the preferred magnification may be produced by one or more other optics of the resonator of FIG. 4b. For example, resonator reflector 20 may be preferably spherical, toriqual or otherwise have a convex curvature in each of orthogonal cross sectional beam axis directions for magnifying the beam in each of these directions for suppressing beam parameter fluctuations.

As discussed above with reference to FIG. 4a, and although not illustrated in FIG. 4b, intracavity magnification of the beam in one or both cross-sectional beam axis directions may be alternatively achieved refractively or diffractively. For example, an intracavity optical element other than either of the resonator reflectors 16 or 20 may serve to magnify the beam in one or both cross sectional beam axis directions. A pair of intracavity optical elements other than the resonator reflectors 16 or 20 may serve to magnify the beam in first and second orthogonal cross sectional beam axis directions. Alternatively, one of the resonator reflectors 16 or 20 may serve to magnify the beam in a first cross sectional beam axis direction, while an intracavity optical element other than one of the reflectors 16 or 20 may serve to magnify the beam in another direction, such that magnification occurs in each of orthogonal cross sectional beam axis directions.

The resonator of FIG. 4b is preferably a narrow band excimer or molecular fluorine laser or a very narrow band excimer or molecular fluorine laser. For example, the resonator may include an interferometric device having parallel surfaces such as an etalon or non-parallel surfaces such as described in the '803 application, mentioned above, together with the grating 16 for producing a beam having a bandwidth of 0.6 pm or less, and even as small as 0.1–0.2 pm or less. The resonator of FIG. 4b may be preferably a polarization coupled resonator such as is described in detail at U.S. Pat. Nos. 5,150,370 and 5,559,816, which are hereby incorporated by reference, where the reflector 20 is a highly reflective (HR) mirror, and is preferably convex (spherical or toriqual) shaped, although the mirror 20 may be alternatively configured depending on the rest of the resonator setup as described above.

In either of the illustrative embodiments described above and schematically shown at FIGS. 4a–4b, one or more collimating optical elements may be included in the resonator such as may be described in U.S. Pat. No. 5,946,337, which is hereby incorporated by reference. The collimating element or elements may include one or preferably two cylindrical lenses or still more preferably a collimating spherical or toriqual lens or a lens that otherwise has collimating power in each cross sectional beam axis direction corresponding to the magnifying powers of the optics as described above in each cross sectional beam axis direction. The collimating elements may alternatively be reflective such that at least one of the reflectors 8 and 10 or 16 and 20 of FIGS. 4a or 4b, respectively, does not provide magnification and the other reflector and/or another intracavity optic may provide the magnification in each cross sectional beam axis direction, as is preferred herein, or the collimating element may be reflective and be disposed in the resonator between the resonator reflectors 8 and 10 or 16 and 20, such as is described for the beam expander set forth in U.S. Pat. No. 6,163,559, which is hereby incorporated by reference.

OVERALL LASER SYSTEM

Figure 5:
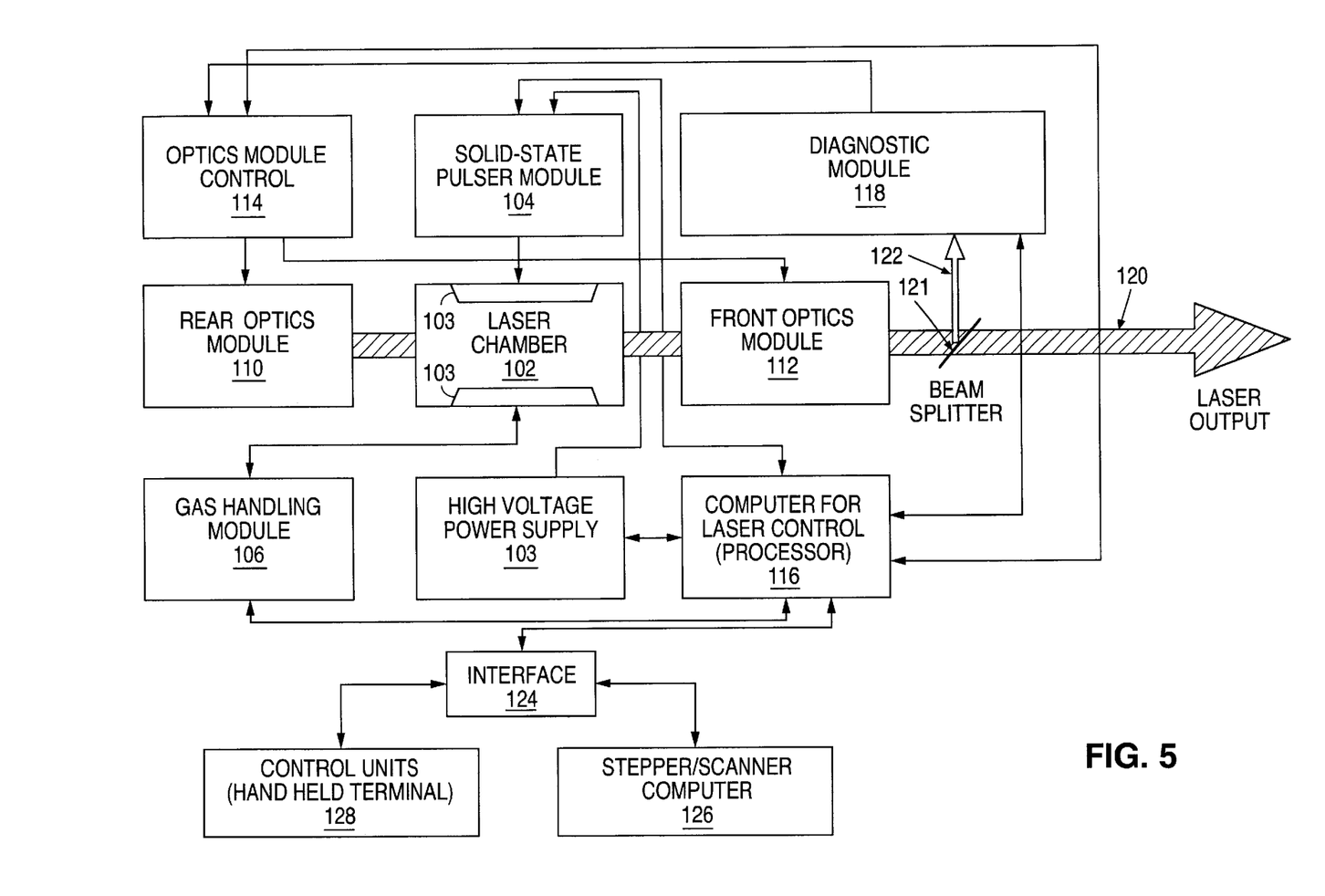
FIG. 5 schematically shows an excimer or molecular fluorine laser system according to a preferred embodiment.

FIG. 5 schematically illustrates an overall excimier or molecular fluorine laser system according to a preferred embodiment which preferably includes the advantageous features described above with reference to FIGS. 4a–4b. Referring to FIG. 5, a preferred excimer or molecular fluorine laser system is a DUV or VUV laser system, such as a KrF, ArF or molecular fluorine ($F_2$) laser system, for use with a deep ultraviolet (DUV) or vacuum ultraviolet (VUV) lithography system. Alternative configurations for laser systems for use in such other industrial applications as TFT annealing, photoablation and/or micromachining, e.g., include configurations understood by those skilled in the art as being similar to and/or modified from the system shown in FIG. 5 to meet the requirements of that application. For this purpose, alternative DUV or VUV laser system and component configurations are described at U.S. patent applications Ser. Nos. 09/317,695, 09/130,277, 09/244,554, 09/452,353, 09/512,417, 09/599,130, 09/694,246, 09/712,877, 09/574,921, 09/738,849, 09/718,809, 09/629,256, 09/712,367, 09/771,366, 09/715,803, 09/738,849, 60/202,564, 60/204,095, 09/741,465, 09/574,921, 09/734,459, 09/741,465, 09/686,483, 09/584,420, 09/843,604, 09/780,120, 09/792,622, 09/791,431, 09/811,354, 09/838,715, 09/715,803, 09/717,757, 09/771,013, 09/791,430, 09/712,367 and 09/780,124, and U.S. Pat. Nos. 6,005,880, 6,061, 382, 6,020,723, 6,219,368, 6,212,214, 6,154,470, 6,157,662, 6,243,405, 6,243,406, 6,198,761, 5,946,337, 6,014,206, 6,157,662, 6,154,470, 6,160,831, 6,160,832, 5,559,816, 4,611,270, 5,761,236, 6,212,214, 6,243,405, 6,154,470, and 6,157,662, each of which is assigned to the same assignee as the present application and is hereby incorporated by reference.

DISCHARGE TUBE

The system shown in FIG. 5 generally includes a laser chamber 102 (or laser tube including a heat exchanger and fan for circulating a gas mixture within the chamber 102 or tube) having a pair of main discharge electrodes 103 connected with a solid-state pulser module 104, and a gas handling module 106. The gas handling module 106 has a valve connection to the laser chamber 102 so that halogen, any active rare gases and a buffer gas or buffer gases, and optionally a gas additive, may be injected or filled into the laser chamber, preferably in premixed forms (see U.S. patent applications Ser. Nos. 09/513,025, 09/780,120, 09/734,459 and 09/447,882, which is assigned to the same assignee as the present application, and U.S. Pat. Nos. 4,977,573 and 6,157,662, which are each hereby incorporated by reference. The solid-state pulser module 104 is powered by a high voltage power supply 108. A thyratron pulser module may alternatively be used. The laser chamber 102 is surrounded by optics module 110 and optics module 112, forming a resonator. The optics modules 110 and 112 may be controlled by an optics control module 114, or may be alternatively directly controlled by a computer or processor 116, particular when line-narrowing optics are included in one or both of the optics modules 110,112, such as is preferred when KrF, ArF or $F_2$ lasers are used for optical lithography.

PROCESSOR CONTROL

The processor 116 for laser control receives various inputs and controls various operating parameters of the system. A diagnostic module 118 receives and measures one or more parameters, such as pulse energy, average energy and/or power, and preferably wavelength, of a split off portion of the main beam 120 via optics for deflecting a small portion 122 of the beam toward the module 118, such as preferably a beam splitter module 121. The beam 120 is preferably the laser output to an imaging system (not shown) and ultimately to a workpiece (also not shown) such as particularly for lithographic applications, and may be output directly to an application process. The laser control computer 116 may communicate through an interface 124 with a stepper/scanner computer, other control units 126,128 and/or other external systems.

The processor or control computer 116 receives and processes values of some of the pulse shape, energy, ASE, energy stability, energy overshoot for burst mode operation, wavelength, spectral purity and/or bandwidth, among other input or output parameters of the laser system and output beam. The processor 116 also controls the line narrowing module to tune the wavelength and/or bandwidth or spectral purity, and controls the power supply and pulser module 104 and 108 to control preferably the moving average pulse power or energy, such that the energy dose at points on the workpiece is stabilized around a desired value. In addition, the computer 116 controls the gas handling module 106 which includes gas supply valves connected to various gas sources. Further functions of the processor 116 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 5, the processor 116 preferably communicates with the solid-state or thyratron pulser module 104 and HV power supply 108, separately or in combination, the gas handling module 106, the optics modules 110 and/or 112, the diagnostic module 118, and an interface 124. The laser resonator which surrounds the laser chamber 102 containing the laser gas mixture includes optics module 110 including line-narrowing optics for a line narrowed excimer or molecular fluorine laser, which may be replaced by a high reflectivity mirror or the like in a laser system wherein either line-narrowing is not desired, or if line narrowing is performed at the front optics module 112, or a spectral filter external to the resonator is used for narrowing the linewidth of the output beam.

SOLID STATE PULSER MODULE

The laser chamber 102 contains a laser gas mixture and includes one or more preionization electrodes (not shown) in addition to the pair of main discharge electrodes 103. Preferred main electrodes 103 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units are set forth at U.S. patent applications Ser. No. 09/692,265 (particularly preferred for KrF, ArF, $F_2$ lasers), 09/532,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

The solid-state or thyratron pulser module 104 and high voltage power supply 108 supply electrical energy in compressed electrical pulses to the preionization and main electrodes 103 within the laser chamber 102 to energize the gas mixture. Components of the preferred pulser module and high voltage power supply may be described at U.S. patent applications Ser. Nos. 09/640,595, 60/198,058, 60/204,095, 09/432,348 and 09/390,14 6, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

RESONATOR, GENERAL

The laser resonator which surrounds the laser chamber 102 containing the laser gas mixture includes optics module 110 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 112, or a spectral filter external to the resonator is used, or if the line-narrowing optics are disposed in front of the HR mirror, for narrowing the bandwidth of the output beam. For an $F_2$-laser, optics for selecting one of multiple lines around 157 nm may be used, e.g., one or more dispersive prisms, birefringent plates or blocks and/or an interferometric device such as an etalon or a device having a pair of opposed, non-parallel plates such as described in the Ser. No. 09/715,803 application, wherein the same optic or optics or an additional line-narrowing optic or optics for narrowing the selected line may be used. Also particularly, for the $F_2$-laser and also possibly for other excimer lasers, the total gas mixture pressure may be lower than conventional systems, e.g., lower than 3 bar, for producing the selected line at a narrow bandwidth such as 0.5 pm or less without using additional line-narrowing optics (see U.S. patent application Ser. No. 60/212,301, which is assigned to the same assignee as the present application and is hereby incorporated by reference).

The laser chamber 102 is sealed by windows transparent to the wavelengths of the emitted laser radiation 120. The windows may be Brewster windows or may be aligned at another angle, e.g., 5°, to the optical path of the resonating beam. One of the windows may also serve to output couple the beam or as a highly reflective resonator reflector on the opposite side of the chamber 102 as the beam is outcoupled.

DIAGNOSTIC MODULE

After a portion of the output beam 120 passes the outcoupler of the optics module 112, that output portion preferably impinges upon a beam splitter module 121 which includes optics for deflecting a portion 122 of the beam to the diagnostic module 118, or otherwise allowing a small portion 122 of the outcoupled beam to reach the diagnostic module 118, while a main beam portion 120 is allowed to continue as the output beam 120 of the laser system (see U.S. patent applications Ser. Nos. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 118. A holographic beam sampler, transmission grating, partially transmissive reflection diffraction grating, grism, prism or other refractive, dispersive and/or transmissive optic or optics may also be used to separate a small beam portion from the main beam 120 for detection at the diagnostic module 118, while allowing most of the main beam 120 to reach an application process directly or via an imaging system or otherwise. These optics or additional optics may be used to filter out visible radiation such as the red emission from atomic fluorine in the gas mixture from the split off beam prior to detection.

The output beam 120 may be transmitted at the beam splitter module while a reflected beam portion is directed at the diagnostic module 118, or the main beam 120 may be reflected, while a small portion is transmitted to the diagnostic module 118. The portion of the outcoupled beam which continues past the beam splitter module 121 is the output beam 120 of the laser, which propagates toward an industrial or experimental application such as an imaging system and workpiece for photolithographic applications.

The diagnostic module 118 preferably includes at least one energy detector. This detector measures the total energy of the beam portion that corresponds directly to the energy of the output beam 120 (see U.S. pat. Nos. 4,611,270 and 6,212,214 which are hereby incorporated by reference). An optical configuration such as an optical attenuator, e.g., a plate or a coating, or other optics may be formed on or near the detector or beam splitter module 121 to control the intensity, spectral distribution and/or other parameters of the radiation impinging upon the detector (see U.S. patent applications Ser. Nos.09/172,805, 09/741,465, 09/712,877, 09/771,013 and 09/771,366, each of which is assigned to the same assignee as the present application and is hereby incorporated by reference).

One other component of the diagnostic module 118 is preferably a wavelength and/or bandwidth detection component such as a monitor etalon or grating spectrometer (see U.S. patent applications Nos. 09/416,344, 09/686,483, and 09/791,431, each of which is assigned to the same assignee as the present application, and U.S. pat. Nos. 4,905,243, 5,978,391, 5,450,207, 4,926,428, 5,748,346, 5,025,445, 6,160,832, 6,160,831 and 5,978,394, all of the above wavelength and/or bandwidth detection and monitoring components being hereby incorporated by reference). The bandwidth and/or wavelength or other spectral, energy or other beam parameter may be monitored and controlled in a feedback loop including the processor 116 and optics control modules 110,112, gas handling module 106, power supply and pulser modules 103,104, or other laser system component modules. For example, the total pressure of the gas mixture in the laser tube 102 may be controlled to a particular value for producing an output beam at a particular bandwidth and/or energy.

Other components of the diagnostic module may include a pulse shape detector or ASE detector, such as are described at U.S. Pat Nos.6,243,405 and 6,243,406 and U.S. patent application Ser. No. 09/842,281, which is assigned to the same assignee as the present application, each of which are hereby incorporated by reference, such as for gas control and/or output beam energy stabilization, or to monitor the amount of amplified spontaneous emission (ASE) within the beam to ensure that the ASE remains below a predetermined level. There may be a beam alignment monitor, e.g., such as is described at U.S. Pat. No. 6,014 ,206, or beam profile monitor, e.g., U.S. patent application Ser. No. 09/780,124, which is assigned to the same assignee, wherein each of these patent documents is hereby incorporated by reference.

BEAM PATH ENCLOSURE

Particularly for the molecular fluorine laser system, and for the ArF laser system, an enclosure (not shown) preferably seals the beam path of the beam 120 such as to keep the beam path free of photoabsorbing species. Smaller enclosures preferably seal the beam path between the chamber 102 and the optics modules 110 and 112 and between the beam splitter 122 and the diagnostic module 118. The optics modules 110 and 112 are maintained in an atmosphere that is sufficiently evacuated or have an inert gas purged atmosphere. Preferred enclosures are described in detail in U.S. patent applications Ser. Nos. 09/598,552, 09/594,892, 09/727,600, 09/317,695 and 09/131,580, which are assigned to the same assignee and are hereby incorporated by reference, and U.S. Pat. Nos. 6,219,368, 5,559,584, 5,221,823, 5,763,855, 5,811,753 and 4,616,908, all of which are hereby incorporated by reference.

GAS MIXTURE

The laser gas mixture is initially filled into the laser chamber 102 in a process referred to herein as a "new fills".

In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162, 6,243,406 and 4,977,573 and U.S. patent applications Ser. Nos. 09/513,025, 09/447,882, and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the 09/513,025 application incorporated by reference above. Specifically, for the F2-laser, an addition of xenon, krypton and/or argon may be used. The concentration of xenon or argon in the mixture may range from 0.0001 % to 0.1 %. For an ArF-laser, an addition of xenon or krypton may be used also having a concentration between 0.0001% to 0.1%. For the KrF laser, an addition of xenon or argon may be used also having a concentration between 0.0001% to 0.1%. Gas replenishment actions are described below for gas mixture compositions of systems such as ArF, KrF, and XeCl excimer lasers and molecular fluorine lasers, wherein the ideas set forth herein may be advantageously incorporated into any of these systems, and other gas discharge laser systems.

GAS REPLENISHMENT

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 102 of, e.g., 100 liters, total pressure adjustments and gas replacement procedures may be performed using the gas handling module 106 preferably including a vacuum pump, a valve network and one or more gas compartments. The gas handling module 106 receives gas via gas lines connected to gas containers, tanks, canisters and/or bottles. Some preferred and alternative gas handling and/or replenishment procedures, other than as specifically described herein (see below), are described at U.S. Pat. Nos. 4,977,573, 6,212,214 , 6,243,406 and 5,396,514 and U.S. patent applications Ser. Nos. 09/447,882, 09/734,459, 09/513,025 and 09/588,561, each of which is assigned to the same assignee as the present application, and U.S. Pat. Nos. 5,978,406, 6,014 ,398 and 6,028,880, all of which are hereby incorporated by reference. A xenon gas or other gas additive supply may be included either internal or external to the laser system according to the '025 application, mentioned above.

Total pressure adjustments in the form of releases of gases or reduction of the total pressure within the laser tube 102 may also be performed. Total pressure adjustments may be followed by gas composition adjustments if it is determined that, e.g., other than the desired partial pressure of halogen gas is within the laser tube 102 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini-or macro-gas replacement operations, or partial new fill operations, depending on the amount of gas replaced, e.g., anywhere from a few milliliters up to 50 liters or more, but less than a new fill, such as are set forth in the 09/734,459 application, incorporated by reference above. As an example, the gas handling unit 106 connected to the laser tube 102 either directly or through an additional valve assembly, such as may include a small compartment for regulating the amount of gas injected (see the '459 application), may include a gas line for injecting a premix A including 1%$F_2$:99%Ne or other buffer gas such as He, and another gas line for injecting a premix B including 1% rare gas:99% buffer gas, for a rare gas-halide excimer laser, wherein for a $F_2$ laser premix B is not used. Another line may be used for injecting a gas additive or gas additive premix, or a gas additive may be added to premix A, premix B or a buffer gas. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 102 via the valve assembly, the fluorine concentration in the laser tube 102 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, or more depending on the degree of stability desired, and any and all other gas replenishment actions are initiated and controlled by the processor 116 which controls valve assemblies of the gas handling unit 106 and the laser tube 102 based on various input information in a feedback loop. These gas replenishment procedures may be used in combination with gas circulation loops and/or window replacement procedures to achieve a laser system having an increased servicing interval for both the gas mixture and the laser tube windows.

LINE NARROWING

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm or less). These exemplary embodiments may be used for selecting the primary line $\lambda_1$ only, or may be used to provide additional line narrowing as well as performing line-selection, or the resonator may include optics for line-selection and additional optics for line-narrowing of the selected line, and line-narrowing may be provided by controlling (i.e., reducing) the total pressure (see U.S. patent application Ser. No. 60/212,301, which is assigned to the same assignee and is hereby incorporated by reference). Line-selection and/or line-narrowing is also further described above with reference to FIGS. 4a and 4b.

Exemplary line-narrowing optics contained in the optics module 110 include a beam expander, an optional interferometric device such as an etalon or a device having a pair of opposed non-planar reflection plates such as may be described in the 09/715,803 or 60/280,398 applications, which are assigned to the same assignee as the present application and are hereby incorporated by reference, and a diffraction grating, and alternatively one or more dispersion prisms may be used, wherein the grating would produce a relatively higher degree of dispersion than the prisms although generally exhibiting somewhat lower efficiency than the dispersion prism or prisms, for a narrow band laser such as is used with a refractive or catadioptric optical lithography imaging system. As mentioned above, the front optics module may include line-narrowing optics such as may be described in any of the Ser. Nos. 09/715,803, 09/738,849, and 09/718,809 applications, each being assigned to the same assignee and hereby incorporated by reference.

Instead of having a retro-reflective grating in the rear optics module 110, the grating may be replaced with a highly reflective mirror, and a lower degree of dispersion may be produced by a dispersive prism, or a beam expander and an interferometric device such as an etalon or device having non-planar opposed plates may be used for line-selection and narrowing, or alternatively no line-narrowing or line-selection may be performed in the rear optics module 110. In the case of using an all-reflective imaging system, the laser may be configured for semi-narrow band operation such as having an output beam linewidth in excess of 0.5 pm, depending on the characteristic broadband bandwidth of the laser, such that additional line-narrowing of the selected line would not be used, either provided by optics or by reducing the total pressure in the laser tube.

The beam expander of the above exemplary line-narrowing optics of the optics module 110 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the 09/771,366 application and the 6,154,470 patent, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

Depending on the type and extent of line-narrowing and/or selection and tuning that is desired, and the particular laser that the line-narrowing optics are to be installed into, there are many alternative optical configurations that may be used other than those specifically described above with respect to FIGS. 4a–4b. For this purpose, those shown in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

ADDITIONAL LASER SYSTEM FEATURES

Optics module 112 preferably includes means for outcoupling the beam 120, such as a partially reflective resonator reflector. The beam 120 may be otherwise outcoupled such as by an intra-resonator beam splitter or partially reflecting surface of another optical element, and the optics module 112 would in this case include a highly reflective mirror. The optics control module 114 preferably controls the optics modules 110 and 112 such as by receiving and interpreting signals from the processor 116, and initiating realignment, gas pressure adjustments in the modules 110,112, or reconfiguration procedures (see the '353, '695, '277, '554, and '527 applications mentioned above).

The halogen concentration in the gas mixture is maintained constant during laser operation by gas replenishment actions by replenishing the amount of halogen in the laser tube for the preferred excimer or molecular fluorine laser herein, such that these gases are maintained in a same predetermined ratio as are in the laser tube 102 following a new fill procedure. In addition, gas injection actions such as μHIs as understood from the '882 application, mentioned above, may be advantageously modified into micro gas replacement procedures, such that the increase in energy of the output laser beam may be compensated by reducing the total pressure. In addition, the laser system is preferably configured for controlling the input driving voltage so that the energy of the output beam is at the predetermined desired energy. The driving voltage is preferably maintained within a small range around $HV_{opt}$, while the gas procedure operates to replenish the gases and maintain the average pulse energy or energy dose, such as by controlling an output rate of change of the gas mixture or a rate of gas flow through the laser tube 102. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

In all of the above and below embodiments, the material used for any dispersive prisms, the prisms of any beam expanders, etalons or other interferometric devices, laser windows and the outcoupler is preferably one that is highly transparent at wavelengths below 200 nm, such as at the 157 nm output emission wavElength of the molecular fluorine laser. The materials are also capable of withstanding long-term exposure to ultraviolet light with minimal degradation effects. Examples of such materials are $CaF_2$, $MgF_2$, BaF2, LiF and $SrF_2$, and in some cases fluorine-doped quartz may be used. Also, in all of the embodiments, many optical surfaces, particularly those of the prisms, may or may not have an anti-reflective coating on one or more optical surfaces, in order to minimize reflection losses and prolong their lifetime.

Also, the gas composition for the excimer or molecular fluorine laser in the above configurations uses either helium, neon, or a mixture of helium and neon as a buffer gas. For rare gas-halide excimer lasers, the rare gas is preferably maintained at a concentration of around 1.0% in the gas mixture. The concentration of fluorine in the gas mixture preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and /or oxygen, and/or krypton and/or other gases (see the '025 application) may be used for increasing the energy stability, burst control, and/or output energy of the laser beam. The concentration of xenon, argon, oxygen, or krypton in the mixture as a gas additive may range from 0.0001% to 0.1%, and would be preferably significantly below 0.1%. Some alternative gas configurations including trace gas additives are set forth at U.S. patent application Ser. No. 09/513,025 and U.S. Pat. No. 6,157,662, each of which is assigned to the same assignee and is hereby incorporated by reference.

A line-narrowed oscillator, e.g., a set forth above, may be followed by a power amplifier for increasing the power of the beam output by the oscillator. Preferred features of the oscillator-amplifier set-up are set forth at U.S. patent applications Ser. Nos. 09/599,130 and 60/228,184, which are assigned to the same assignee and are hereby incorporated by reference. The amplifier may be the same or a separate discharge chamber 102. An optical or electrical delay may be used to time the electrical discharge at the amplifier with the reaching of the optical pulse from the oscillator at the amplifier. With particular respect to the $F_2$-laser, a molecular fluorine laser oscillator may have an advantageous output coupler having a transmission interference maximum at $\lambda_1$ and a minimum at $\lambda_2$. A 157 nm beam is output from the output coupler and is incident at the amplifier of this embodiment to increase the power of the beam. Thus, a very narrow bandwidth beam is achieved with high suppression of the secondary line $\lambda_2$ and high power (at least several Watts to more than 10 Watts).

While exemplary drawings and specific embodiments of the present invention have been described and illustrated, it is to be understood that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, steps are provided in a selected order for typographical convenience only and not to imply any particular order for performing the steps. Thus, the steps may be performed in a variety of orders within the scope of those claims, unless a particular order is otherwise expressly indicated or understood by those skilled in the art as being necessary. For example, in some method claims that follow, steps of magnifying the beam and narrowing a bandwidth of the beam may be performed in either or a combination of temporal orders as the beam traverses line-narrowing and/or magnifying elements and is outcoupled from the laser resonator.

What is claimed is:

1. An excimer or molecular fluorine laser system, comprising:
    a laser chamber filled with a gas mixture at least including a halogen-containing molecular species and a buffer gas;
    a plurality of electrodes including a pair of main electrodes and at least one preionization unit within the laser chamber, the main electrodes defining a discharge area therebetween;
    a pulsed discharge circuit connected to the electrodes including a pulse compression circuit and a high voltage power supply for supplying electrical energy in compressed electrical pulses to the electrodes within the laser chamber to energize the gas mixture;
    a fan for circulating the gas mixture through the discharge area;
    a heat exchanger at least for cooling the gas mixture;
    a resonator for generating an output beam including the discharge area within the laser chamber, the resonator including at least one line-narrowing optic, resonator reflecting optics being disposed at either end of said resonator and retro-reflecting the beam within the resonator, said resonator reflecting optics forming an unstable resonator in each of orthogonal (x,y) cross-sectional beam axis directions for suppressing fluctuations in one or more output beam parameters, said beam propagating within the resonator substantially in a third direction (z).

2. The laser system of claim 1, wherein at least one of said resonator reflecting optics includes a spherical surface.

3. The laser system of claim 1, wherein at least one of said resonator reflecting optics includes a toriqual surface.

4. The laser system of claim 1, wherein a first resonator reflecting optic magnifies the beam in a first cross sectional beam axis direction (x), and a second resonator reflecting optic magnifies the beam in a second cross sectional beam axis direction (x±θ) angularly offset from the first cross sectional beam axis direction.

5. The laser system of claim 4, wherein one of said first and second resonator reflecting optics disperses the beam for narrowing a bandwidth of the beam.

6. The laser system of claim 1, wherein said at least one line-narrowing optic is disposed between said resonator reflecting optics.

7. The laser system of claim 1, wherein said resonator reflecting optics are shaped to provide a magnification of the beam of at least 2 in each of said orthogonal beam axis directions (x,y).

8. The laser system of claim 7, wherein said resonator reflecting optics are shaped to provide a magnification of the beam of not more than substantially 4 in each of said orthogonal beam axis directions (x,y).

9. The laser system of claim 1, wherein said resonator reflecting optics are shaped to provide a magnification of the beam of at least 3 in each of said orthogonal beam axis directions (x,y).

10. The laser system of claim 9, wherein said resonator reflecting optics are shaped to provide a magnification of the beam of not more than substantially 4 in each of said orthogonal beam axis directions (x,y).

11. The laser system of claim 1, wherein a first resonator reflecting optic magnifies the beam in both a first and a second orthogonal cross sectional beam axis directions (x,y).

12. The laser system of claim 11, wherein a second resonator reflecting optic disperses the beam for narrowing a bandwidth of the beam.

13. The laser system of claim 11, wherein said at least one line-narrowing optic is disposed between said resonator reflecting surfaces.

14. The laser system of claim 11, wherein said first resonator reflecting optic disperses the beam for narrowing a bandwidth of the beam.

15. An excimer or molecular fluorine laser system, comprising:
    a laser chamber filled with a gas mixture at least including a halogen-containing molecular species and a buffer gas;
    a plurality of electrodes including a pair of main electrodes and at least one preionization unit within the laser chamber, the main electrodes defining a discharge area therebetween;

a pulsed discharge circuit connected to the electrodes including a pulse compression circuit and a high voltage power supply for supplying electrical energy in compressed electrical pulses to the electrodes within the laser chamber to energize the gas mixture;

a fan for circulating the gas mixture through the discharge area;

a heat exchanger at least for cooling the gas mixture;

a resonator for generating an output beam including the discharge area within the laser chamber and resonator reflecting optics at either end and retro-reflecting the beam within the resonator;

a first intracavity optic for narrowing a bandwidth of the output beam and configured to magnify the beam in a first cross-sectional beam axis direction (x) and to render the resonator unstable in the first direction (x); and a second intracavity optic configured to magnify the beam in a second cross-sectional beam axis direction (x±θ) angularly offset from the first cross-sectional beam axis direction and to render the resonator unstable in the second direction (x±θ), said beam propagating within the resonator substantially in a third direction (z), and wherein the first and second intracavity optics thereby suppress fluctuations in one or more output beam parameters.

16. The laser system of claim 15, wherein said intracavity optics are configured to provide a magnification of the beam of at least 2 in each of said cross sectional beam axis directions (x,x±θ).

17. The laser system of claim 16, wherein said intracavity optics are configured to provide a magnification of the beam of not more than substantially 4 in each of said cross sectional beam axis directions (x,x±θ).

18. An excimer or molecular fluorine laser system, comprising:

a laser chamber filled with a gas mixture at least including a halogen-containing molecular species and a buffer gas;

a plurality of electrodes including a pair of main electrodes and at least one preionization unit within the laser chamber, the main electrodes defining a discharge area therebetween;

a pulsed discharge circuit connected to the electrodes including a pulse compression circuit and a high voltage power supply for supplying electrical energy in compressed electrical pulses to the electrodes within the laser chamber to energize the gas mixture;

a fan for circulating the gas mixture through the discharge area;

a heat exchanger at least for cooling the gas mixture;

a resonator for generating an output beam including the discharge area within the laser chamber and resonator reflecting surfaces at either end and retro-reflecting the beam within the resonator;

at least one intracavity optic for narrowing a bandwidth of the output beam;

a first intracavity optic configured to magnify the beam in a first cross-sectional beam axis direction (x) and to render the resonator unstable in the first direction (x); and a second intracavity optic configured to magnify the beam in a second cross-sectional beam axis direction (x±θ) angularly offset from the first cross-sectional beam axis direction and to render the resonator unstable in the second direction (x±θ), said beam propagating within the resonator substantially in a third direction (z), and wherein the first and second intracavity optics thereby suppress fluctuations in one or more output beam parameters.

19. The laser system of claim 18, wherein said intracavity optics are configured to provide a magnification of the beam of at least 2 in each of said cross sectional beam axis directions (x,x±θ).

20. The laser system of claim 19, wherein said intracavity optics are configured to provide a magnification of the beam of not more than substantially 4 in each of said cross sectional beam axis directions (x,x±θ).

21. An excimer or molecular fluorine laser system, comprising:

a laser chamber filled with a gas mixture at least including a halogen-containing molecular species and a buffer gas;

a plurality of electrodes including a pair of main electrodes and at least one preionization unit within the laser chamber, the main electrodes defining a discharge area therebetween;

a pulsed discharge circuit connected to the electrodes including a pulse compression circuit and a high voltage power supply for supplying electrical energy in compressed electrical pulses to the electrodes within the laser chamber to energize the gas mixture;

a fan for circulating the gas mixture through the discharge area;

a heat exchanger at least for cooling the gas mixture;

a resonator for generating an output beam including the discharge area within the laser chamber and resonator reflecting surfaces at either end and retro-reflecting the beam within the resonator;

an intracavity optic for narrowing a bandwidth of the output beam and configured to magnify the beam in a first and a second orthogonal cross-sectional beam axis directions (x,y) for suppressing fluctuations in one or more output beam parameters, said beam propagating within the resonator substantially in a third direction (z).

22. The laser system of claim 21, wherein said surface of said intracavity optical element is spherical.

23. The laser system of claim 21, wherein said surface of said intracavity optical element is toriqual.

24. The laser system of claim 21, wherein said intracavity optic is configured to provide a magnification of the beam of at least 2 in each of said orthogonal beam axis directions.

25. The laser system of claim 24, wherein said intracavity optic is configured to provide a magnification of the beam of not more than substantially 4 in each of said orthogonal beam axis directions.

26. An excimer or molecular fluorine laser system, comprising:

a laser chamber filled with a gas mixture at least including a halogen-containing molecular species and a buffer gas;

a plurality of electrodes including a pair of main electrodes and at least one preionization unit within the laser chamber, the main electrodes defining a discharge area therebetween;

a pulsed discharge circuit connected to the electrodes including a pulse compression circuit and a high voltage power supply for supplying electrical energy in compressed electrical pulses to the electrodes within the laser chamber to energize the gas mixture;

a fan for circulating the gas mixture through the discharge area;

a heat exchanger at least for cooling the gas mixture;

a resonator for generating an output beam including the discharge area within the laser chamber and resonator reflecting surfaces at either end and retro-reflecting the beam within the resonator;

a first intracavity optic for narrowing a bandwidth of the output beam; and a second intracavity optic including a surface configured to magnify the beam in a first and a second orthogonal cross-sectional beam axis directions (x,y) for suppressing fluctuations in one or more output beam parameters, said beam propagating within the resonator substantially in a third direction (z).

27. The laser system of claim 26, wherein said surface of said second intracavity optical element is spherical.

28. The laser system of claim 26, wherein said surface of said second intracavity optical element is toriqual.

29. The laser system of claim 26, wherein said second intracavity optic is configured to provide a magnification of the beam of at least 2 in each of said orthogonal beam axis directions.

30. The laser system of claim 29, wherein said second intracavity optic is configured to provide a magnification of the beam of not more than substantially 4 in each of said orthogonal beam axis directions.

31. An excimer or molecular fluorine laser system, comprising:

a laser chamber filled with a gas mixture at least including a halogen-containing molecular species and a buffer gas;

a plurality of electrodes including a pair of main electrodes and at least one preionization unit within the laser chamber, the main electrodes defining a discharge area therebetween;

a pulsed discharge circuit connected to the electrodes including a pulse compression circuit and a high voltage power supply for supplying electrical energy in compressed electrical pulses to the electrodes within the laser chamber to energize the gas mixture;

a fan for circulating the gas mixture through the discharge area;

a heat exchanger at least for cooling the gas mixture;

a resonator for generating an output beam including the discharge area within the laser chamber and resonator reflecting optics at either end and retro-reflecting the beam within the resonator;

at least one optic for narrowing a bandwidth of the output beam; and a first intracavity optic configured to magnify the beam in a first cross-sectional beam axis direction (x); and a second intracavity optic configured to magnify the beam in a second cross-sectional beam axis direction (x±θ) angularly offset from the first cross-sectional beam axis direction, said beam propagating within the resonator substantially in a third direction (z), and wherein the first and second intracavity optics thereby suppress fluctuations in one or more output beam parameters.

32. The laser system of claim 31, wherein said intracavity optics are configured to provide a magnification of the beam of at least 2 in each of said cross sectional beam axis directions.

33. The laser system of claim 32, wherein said intracavity optics are configured to provide a magnification of the beam of not more than substantially 4 in each of said cross sectional beam axis directions.

34. An excimer or molecular fluorine laser system, comprising:

a laser chamber filled with a gas mixture at least including a halogen-containing molecular species and a buffer gas;

a plurality of electrodes including a pair of main electrodes and at least one preionization unit within the laser chamber, the main electrodes defining a discharge area therebetween;

a pulsed discharge circuit connected to the electrodes including a pulse compression circuit and a high voltage power supply for supplying electrical energy in compressed electrical pulses to the electrodes within the laser chamber to energize the gas mixture;

a fan for circulating the gas mixture through the discharge area;

a heat exchanger at least for cooling the gas mixture;

a resonator for generating an output beam including the discharge area within the laser chamber and resonator reflecting surfaces at either end and retro-reflecting the beam within the resonator;

at least one optic for narrowing a bandwidth of the output beam;

a reflective optic configured to magnify the beam in a first cross sectional beam axis direction. (x); and an intracavity optic configured to magnify the beam in a second cross sectional beam axis direction (x±θ) angularly offset from the first cross sectional beam axis direction, said beam propagating within the resonator substantially in a third direction (z), and wherein said reflective and intracavity optics thereby suppress fluctuations in one or more output beam parameters.

35. The laser system of claim 34, wherein said optic for narrowing the bandwidth of the output beam comprises said reflective optic.

36. The laser system of claim 34, wherein said optic for narrowing the bandwidth of the output beam comprises said intracavity optic.

37. The laser system of claim 34, wherein said intracavity optic comprises said reflective optic as including a refractive bulk portion with a reflective surface thereon.

38. The laser system of claim 34, wherein said reflective and intracavity optics are configured to provide a magnification of the beam of at least 2 in each of said cross sectional beam axis directions (x,x±θ).

39. The laser system of claim 34, wherein said reflective and intracavity optics are configured to provide a magnification of the beam of not more than substantially 4 in each of said cross sectional beam axis directions (x,x±θ).

40. A method for suppressing fluctuations in one or more beam parameters of an excimer or molecular fluorine laser system, comprising the steps of:

energizing a gain medium of the laser system by applying a pulsed discharge for generating the beam;

narrowing a bandwidth of the beam by interacting the beam with one or more line-narrowing optical elements; and magnifying the beam in orthogonal cross-sectional beam axis directions (x,y) by interacting the beam with one or more magnifying optical elements for suppressing said fluctuations in said one or more output beam parameters, said beam propagating within the resonator substantially in a third direction (z).

41. The method of claim 40, wherein said magnifying step is reflectively performed.

42. The method of claim 40, wherein said magnifying step is refractively performed.

43. The method of claim 40, wherein said magnifying step includes reflectively magnifying said beam in said first cross sectional beam axis direction (x) and refractively magnifying said beam in said second cross sectional beam axis direction (y).

44. The method of claim 40, wherein said magnifying step provides a magnification of the beam of at least 2 in each of said orthogonal beam axis directions (x,y).

45. The method of claim 44, wherein said magnifying step provides a magnification of the beam of not more than substantially 4 in each of said orthogonal beam axis directions (x,y).

46. A method for suppressing fluctuations in one or more beam parameters of an excimer or molecular fluorine laser system, comprising the steps of:

energizing a gain medium of the laser system by applying a pulsed discharge for generating the beam;

narrowing a bandwidth of the beam by passing the beam through one or more line-narrowing optical elements; and magnifying the beam intracavity in orthogonal cross-sectional beam axis directions (x,y) by interacting the beam with one or more magnifying optical elements for suppressing said fluctuations in said one or more output beam parameters, said beam propagating within the resonator substantially in a third direction (z).

47. The method of claim 46, wherein said magnifying step provides a magnification of the beam of at least 2 in each of said orthogonal beam axis directions (x,y).

48. The method of claim 47, wherein said magnifying step provides a magnification of the beam of not more than substantially 4 in each of said orthogonal beam axis directions (x,y).

49. A method for suppressing fluctuations in one or more beam parameters of an excimer or molecular fluorine laser system, comprising the steps of:

energizing a gain medium of the laser system by applying a pulsed discharge for generating the beam;

narrowing a bandwidth of the beam by passing the beam through one or more line-narrowing optical elements;

magnifying the beam intracavity in a first cross-sectional beam axis direction (x) and magnifying the beam in a second cross-section beam axis direction (x±θ) angularly offset from the first cross sectional beam axis direction by interacting the beam with one or more magnifying optical elements for suppressing said fluctuations in said one or more output beam parameters, said beam propagating within the resonator substantially in a third direction (z).

50. The method of claim 49, wherein said magnifying step provides a magnification of the beam of at least 2 in each of said cross sectional beam axis directions (x,x±θ).

51. The method of claim 50, wherein said magnifying step provides a magnification of the beam of not more than substantially 4 in each of said cross sectional beam axis directions (x,x±θ).

52. The laser of claim 31, the first intracavity optic rendering the resonator unstable in the first cross-sectional beam axis direction (x).

53. The laser of claim 52, the second intracavity optic rendering the resonator unstable in the second cross-sectional beam axis direction (x±θ).

54. The method of claim 49, the step of magnifying the beam in the first cross-sectional beam axis direction (x) rendering the resonator of the laser unstable in is the first cross-sectional beam axis direction (x).

55. The method of claim 54, the step of magnifying the beam in the second cross-sectional beam axis direction (x±θ) rendering the resonator of the laser unstable in the second cross-sectional beam axis direction (x±θ).

* * * * *